(12) United States Patent
Faitelson et al.

(10) Patent No.: US 11,386,224 B2
(45) Date of Patent: Jul. 12, 2022

(54) METHOD AND SYSTEM FOR MANAGING PERSONAL DIGITAL IDENTIFIERS OF A USER IN A PLURALITY OF DATA ELEMENTS

(71) Applicant: VARONIS SYSTEMS INC., New York, NY (US)

(72) Inventors: Yakov Faitelson, New York, NY (US); Ophir Kretzer-Katzir, Tenafly, NJ (US); David Bass, Karmei Yosef (IL)

(73) Assignee: VARONIS SYSTEMS INC, New York, NY (US)

( * ) Notice: Subject to any disclaimer, the term of this patent is extended or adjusted under 35 U.S.C. 154(b) by 303 days.

(21) Appl. No.: 16/358,747

(22) Filed: Mar. 20, 2019

(65) Prior Publication Data
US 2020/0302081 A1  Sep. 24, 2020

(51) Int. Cl.
| | | |
|---|---|---|
| *H04L 29/06* | (2006.01) | |
| *G06F 21/62* | (2013.01) | |
| *G06F 21/31* | (2013.01) | |

(52) U.S. Cl.
CPC .......... *G06F 21/6245* (2013.01); *G06F 21/31* (2013.01)

(58) Field of Classification Search
CPC . G06F 21/6245; G06F 16/958; H04L 63/102; H04L 67/22
See application file for complete search history.

(56) References Cited

U.S. PATENT DOCUMENTS

| | | | |
|---|---|---|---|
| 6,516,337 B1* | 2/2003 | Tripp | G06F 16/951 709/202 |
| 7,162,473 B2* | 1/2007 | Dumais | G06F 16/9535 |
| 2008/0183700 A1* | 7/2008 | Gabriel | G06F 16/951 |
| 2009/0254572 A1 | 10/2009 | Redlich et al. | |
| 2012/0203733 A1* | 8/2012 | Zhang | G06Q 50/01 707/600 |
| 2013/0097157 A1* | 4/2013 | Ng | G06F 16/248 707/723 |
| 2014/0032259 A1* | 1/2014 | LaFever | G06Q 30/0271 705/7.29 |

* cited by examiner

*Primary Examiner* — Jason K Gee
(74) *Attorney, Agent, or Firm* — Soroker Agmon Nordman

(57) ABSTRACT

A method for managing personal digital identifiers of a user in data elements stored in a computerized system may include receiving personal digital identifiers for identifying a user. The data elements may be searched for the personal digital identifiers and data elements may be identified as having the personal digital identifiers of the user. One or more candidate personal digital identifiers in the identified data elements may be assigned as one or more common words appearing in the identified data elements when a word count for each of the one or more common words exceeds a predefined threshold. The user may validate the candidate personal digital identifiers, which may be added to the personal digital identifiers of the user. A personal digital footprint of the user including a location in the computerized system for each of the personal digital identifiers in the identified data elements may be stored.

22 Claims, 5 Drawing Sheets

METHOD AND SYSTEM FOR MANAGING PERSONAL DIGITAL IDENTIFIERS OF A USER IN A PLURALITY OF DATA ELEMENTS

FIELD OF THE DISCLOSURE

The present disclosure relates to data security, and more particularly to a method and system for managing personal digital identifiers in a plurality of data elements.

BACKGROUND

Personal identifiable information, or any information that may be tied to a specific person, may be stored and shared between a myriad of computing systems over communication networks. Privacy, security and protection laws of personal identifiable information are becoming stricter. Owners of the computing systems storing and managing personal identifying information of the specific person may be soon be required upon demand to supply the location and access information of the personal identifiable information the person specifying the type of personal identifiable information, the location and the parties able to access the personal identifiable information of the specific person.

For example, the General Data Protection Regulation (GDPR) of the European Union went into effect in May 2018. The GDPR aims to give control to individuals over their personal data and to simplify the regulatory environment and unifying the regulation within the EU. Data protection under the terms of GDPR must provide safeguards to protect personal identifying information of the specific person such that so that personal identifying information is not available publicly without explicit, informed consent of the specific person, and cannot be used to identify the specific person without additional information stored separately.

Data with personal identifiable information of a specific person may be found not only stored in databases but also in files, text and e-mail messages, and the like. The personal identifiable information data of a specific person may be scattered across different physical locations and in storage systems located in different countries. Furthermore, one piece of personal identifiable information, such as a person's name may be stored in one file and another piece of personal identifiable information, such as a picture or the person's social security number may be found in another file.

Thus, it may be desirable to have a method and system for locating and managing personal identifiable information of a person stored on storage devices at different locations.

SUMMARY

There is thus provided, in accordance with some embodiments of the present disclosure, a computerized method for managing personal digital identifiers of a user in a plurality of data elements stored in a computerized system may be performed by a plurality of computerized devices communicating over a communication network of the computerized system. The plurality of computerized devices may include a plurality of processors or a plurality of storage devices storing a plurality of data elements. The method may include:

(a) receiving personal digital identifiers for identifying a user by a processor from the plurality of processors respectively in a computerized device from the plurality of computerized devices;

(b) obtaining patterns of identifiers of the personal digital identifiers by the processor;

(c) searching the plurality of data elements stored in the plurality of storage devices for the personal digital identifiers using the patterns of identifiers of the personal digital identifiers by the plurality of processors;

(d) identifying by the plurality of processors, data elements from the plurality of data elements stored in the plurality of storage devices that include the personal digital identifiers of the user;

(e) receiving by the processor, the identified data elements with the personal digital identifiers of the user from the plurality of computerized devices;

(f) assigning by the processor, one or more candidate personal digital identifiers in the identified data elements, respectively as one or more common words appearing in the identified data elements when a word count for each of the one or more common words in the identified data elements exceeds a predefined threshold:

(g) upon validating by the user the one or more candidate personal digital identifiers, adding by the processor the validated candidate personal digital identifiers to the personal digital identifiers of the user, and (h) storing by the processor in a storage device of the computerized device, a personal digital footprint of the user including a location in the computerized system for each of the personal digital identifiers in the identified data elements.

Furthermore, in accordance with some embodiments of the present disclosure, the method may include reporting by the processor the personal digital footprint to the user.

Furthermore, in accordance with some embodiments of the present disclosure, searching for the personal digital identifiers in the plurality of data elements may include assigning a priority to each of the personal digital identifiers and searching for the personal digital identifiers according to the assigned priority.

Furthermore, in accordance with some embodiments of the present disclosure, assigning the priority to each of the personal digital identifiers may include assigning a weight to each of the personal digital identifiers.

Furthermore, in accordance with some embodiments of the present disclosure, the method may include searching for the personal digital identifiers in data elements of other computerized systems communicating with the computerized system.

Furthermore, in accordance with some embodiments of the present disclosure, searching for the personal digital identifiers in data elements in the one or more additional computerized devices may include searching databases on third party storage devices.

Furthermore, in accordance with some embodiments of the present disclosure, searching the plurality of data elements may include searching the plurality of data elements for the personal digital identifiers in response to receiving the personal digital identifiers for identifying the user.

Furthermore, in accordance with some embodiments of the present disclosure, receiving the personal digital identifiers for identifying the user may include receiving a request from the user for the personal digital footprint of the user.

Furthermore, in accordance with some embodiments of the present disclosure, the method may include repeating (c) to (h) at predefined time intervals.

Furthermore, in accordance with some embodiments of the present disclosure, the method may include providing a risk assessment in the stored personal digital footprint of the user.

Furthermore, in accordance with some embodiments of the present disclosure, the method may include deleting some or all of the personal digital identifiers in the identified data elements in response to a deletion request.

Furthermore, in accordance with some embodiments of the present disclosure, the method may include moving some or all of the personal digital identifiers in the identified data elements to a different location in response to a move request.

Furthermore, in accordance with some embodiments of the present disclosure, the method may include moving some or all of the personal digital identifiers in the identified data elements to the different location in accordance with a set of rules for data transport.

Furthermore, in accordance with some embodiments of the present disclosure, the method may include changing access permissions of some or all of the personal digital identifiers in the identified data elements in response to a change access request.

Furthermore, in accordance with some embodiments of the present disclosure, receiving the personal digital identifiers for identifying the user may include entering by the user the personal digital identifiers on a digital form.

Furthermore, in accordance with some embodiments of the present disclosure, validating the one or more candidate personal digital identifiers by the user may include requesting the user to validate the one or more candidate personal digital identifiers appearing on a digital form.

Furthermore, in accordance with some embodiments of the present disclosure, the method may include monitoring CPU loading in the plurality of computerized devices or data throughput in communications between the plurality of computerized devices in the communication network, and dynamically adding or reducing computerized devices or network resources in response to the monitored CPU loading or data throughput in the communications.

Furthermore, in accordance with some embodiments of the present disclosure, the data elements may be selected from the group consisting of: files, folders, sharepoint documents, and e-mail messages.

Furthermore, in accordance with some embodiments of the present disclosure, the personal digital identifiers of the user may be selected from the group consisting of: user name, login name, passwords, phone numbers, title, addresses, office location, bank account information, social security number, country identification number, employee identification number, credit or debit card numbers, family member information, and marital status.

Furthermore, in accordance with some embodiments of the present disclosure, the personal digital footprint of the user may be stored in a secure environment or a secure database.

Furthermore, in accordance with some embodiments of the present disclosure, the computerized system may be an enterprise.

There is further provided, in accordance with some embodiments of the present disclosure, a computerized device for managing personal digital identifiers of a user in a plurality of data elements stored in a plurality of storage devices in a computerized system may include a plurality of storage devices in a computerized system communicating over a communication network storing a plurality of data element and a processor in a computerized device of the computerized system. The processor in the computerized device of the computerized system may be configured to receive personal digital identifiers for identifying a user, to obtain patterns of identifiers of the personal digital identifiers, to receive identified data elements with the personal digital identifiers of the user that were identified in a search of the plurality of data elements stored in the plurality of storage devices for the personal digital identifiers using the patterns of identifiers of the personal digital identifiers, to assign one or more candidate personal digital identifiers in the identified data elements, respectively as one or more common words appearing in the identified data elements when a word count for each of the one or more common words in the identified data elements exceeds a predefined threshold, upon validating by the user the one or more candidate personal digital identifiers, to add the validated candidate personal digital identifiers to the personal digital identifiers of the user, and to store in a storage device of the computerized device, a personal digital footprint of the user including a location in the computerized system for each of the personal digital identifiers in the identified data elements.

BRIEF DESCRIPTION OF THE DRAWINGS

In order for the embodiments of the present disclosure to be better understood and for its practical applications to be appreciated, the following Figures are provided and referenced hereafter. It should be noted that the Figures are given as examples only and in no way limit the scope of the embodiments of the present disclosure. Like components are denoted by like reference numerals.

DETAILED DESCRIPTION

Figure 1:
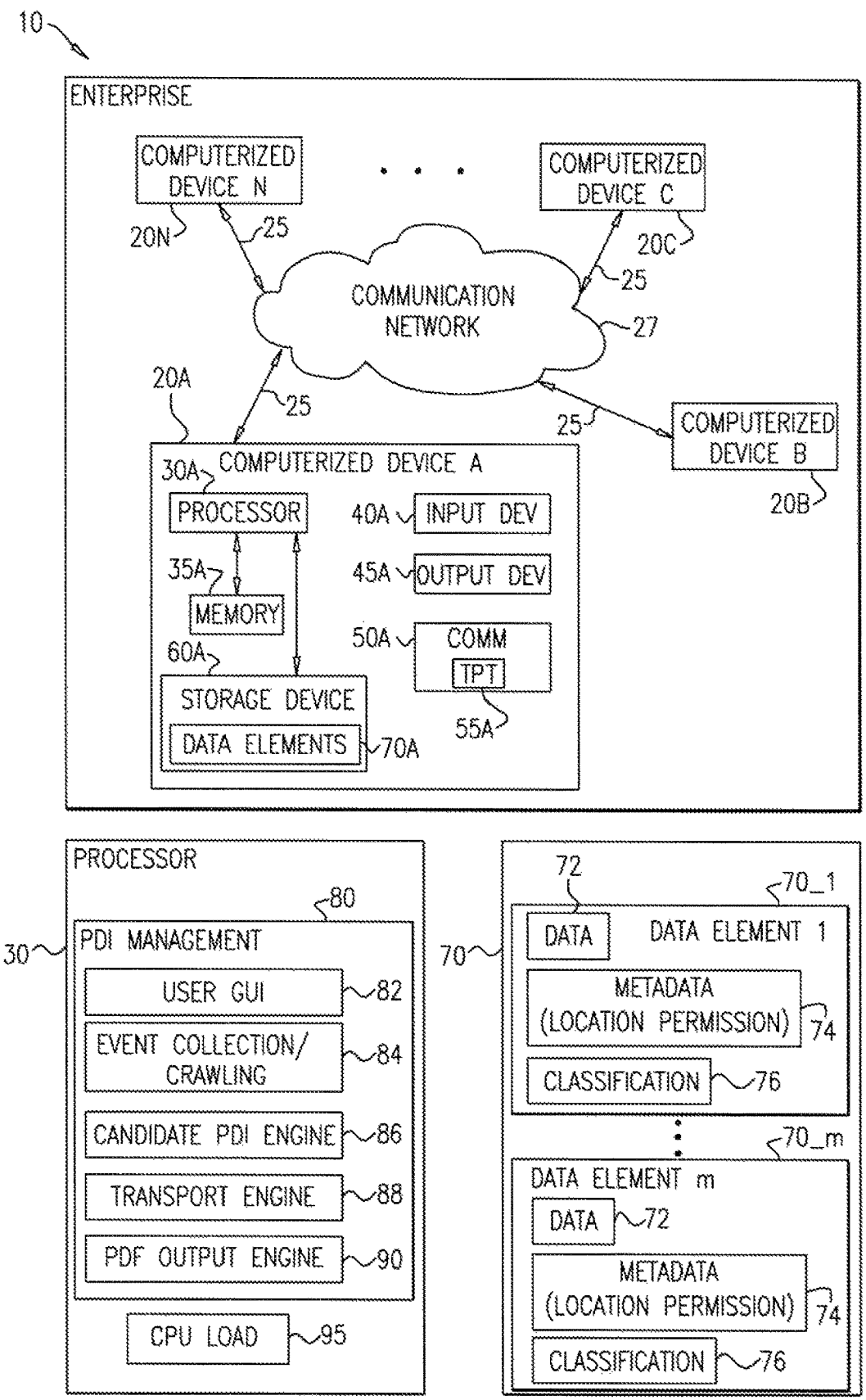
FIG. 1 schematically illustrates a computerized system for identifying and managing personal digital identifiers (PDI) of a user located in a plurality of data elements stored in storage devices, in accordance with some embodiments of the present disclosure.

In the following detailed description, numerous specific details are set forth in order to provide a thorough understanding of the embodiments of the disclosure. However, it will be understood by those of ordinary skill in the art that the embodiments of the disclosure may be practiced without these specific details. In other instances, well-known methods, procedures, components, modules, units and/or circuits have not been described in detail so as not to obscure the embodiments of the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present disclosure herein describe a system and a method for identifying personal digital identifiers (PDI) of a user located in a plurality of data elements stored in a computerized system. The computerized system, which may be an enterprise of an organization, may maintain the personal digital identifiers of different employees, for example, in the organization. The computerized system may include a plurality of computerized devices, each respectively with a processor or a storage device, or both. A user in the context herein may be a person requesting personal digital identifiers for identifying the person, or an employee, such as an administrator requesting to find PDIs of a specific person associated with the organization.

In some embodiments, a request may be made for a user's PDIs that are maintained in the computerized system including any number of initial PDIs of the user that the requester would like to know that are stored and/or accessible to others in the computerized system. Initial PDIs may refer to the known PDIs of a user that the user would normally expect to be maintained within the computerized system. For example, if the computerized system is a human resource database, the user would expect that initial PDIs may include, for example, the user's name, address, country identity number (e.g., social security number), telephone number, age, date of birth, names of family member, and the like.

The request may be made directly by the user using an online form, or by an administrator of the system, or by a human resource specialist in the organization, or by any suitable person with given access to a user's PDIs. The user's initial PDIs may be entered into a PDI management application, for example, executed by the computerized system. In response to the request for the user's PDIs, the PDI management application may be configured to search a plurality of data elements for the initial PDIs within the plurality of the storage devices of the computerized system. Additionally, or optionally, the PDI management application may be configured to infer or deduce possible or candidate user PDIs even though they were not initially requested by the user.

In some embodiments, the PDI management application may then output a list of the user's PDIs that were found in data elements stored in the computerized system, a location of the data elements and/or classification of the data elements and/or permissions of the data elements, (e.g., permission by others to access to the user's PDIs). Additionally, or optionally, the PDI management application may also list candidate PDIs that the user did not initially request. The PDI management application may ask the user to validate if the candidate PDIs are, in fact, real PDIs of the user. Thus, the provided system solves the problem of allowing a user to locate, assess, and/or manage the user's PDIs that may be scattered over many data elements stored in storage devices at different locations of the computerized system.

In some embodiments, an organization or company may want to obtain PDIs for users in the organization. Indexing processes may always be running in a background. For a particular user, the computerized system in search for the PDIs of a particular user may miss a PDI since not enough initial personal data was given by the user. State differently, given the initial personal data input into the system about a particular user, how can the computerized system assess whether the complete subset of PDIs were captured related to the user, or multiple users, for report out to the user(s). Furthermore, the PDIs of users may be unique for each organization or office. For example, the PDIs of customers may be different from the PDIs of employees. The PDIs of employees in Europe may be different from the PDIs of employees in the USA. The embodiments taught herein solve these problems by extracting PDIs from the different users or admins, identifying candidate PDIs that the user(s) may not be aware of, and identifying PDIs in a dynamic way for different groups of users, such as the employeeID as opposed to the employee's social security number.

FIG. 1 schematically illustrates a computerized system 10 for identifying and managing personal digital identifiers (PDI) of a user located in a plurality of data elements stored in storage devices 60, in accordance with some embodiments of the present disclosure. Computerized system 10 may include a plurality of computerized devices 20 communicating 25 over a communication network 27. Each of the N computerized devices 20, where N is the number of computerized devices 20 in system 10, may be denoted 20A, 20B, 20C . . . 20N. Computerized system 10 may be an enterprise, or an organization cloud where the plurality of computerized devices 20 may be multiple different servers.

In some embodiments, computerized device 20 may include a processor 30, an input device 40, an output device 45, and a communication circuitry and interface module 50 for communicating over communication network 27 using any suitable wired and/or wireless communication protocols. Communication circuitry and interface module 50 may include TPT circuitry 55 for measuring and/or assessing network data throughput (TPT). Computerized device 20 may include a computer and/or a server but may also include any type of mobile device and/or tablet communicating over communication network 27 where PDIs of the user may be stored. Processor 30 may communicate with a memory 35 and a storage device 70. Processor 30 may also include CPU load 95 software and/or circuitry for assessing and/or measuring the CPU load of processor 30.

Each of the N computerized devices 20 include processor 30 and storage device 70, which may be respective denoted as processor 30A, 30B, 30C . . . 30N, and storage device 70A, 70B, 70C . . . 70N, and similarly for the other elements in computerized devices 20 where N is the number of computerized devices 20 in system 10.

In some embodiments, processor 30A in one computerized device, such as computerized device 20A, for example, in the plurality of computerized devices in system 10 may be configured to execute code for a PDI management application 80 stored in memory 35A and/or on storage device 60A running on processor 30A. Thus, computerized device 20A may control the management of the PDIs of the user in computerized system 10. The user may request PDIs using input device 40A and may receive a report about the location of PDI identified in multiple data elements on output device 45A. The designation of one computerized device such as computerized device 20A in the plurality of computerized devices 20 in system 10 that may be configured to run PDI management application 80 is merely for conceptual clarity and not by way of limitation of the embodiments disclosed herein. Any one of the plurality of computerized devices 20 may be assigned to run PDI management application 80 for controlling the management of the PDIs of the user in computerized system 10.

In some embodiments, PDI management application 80 may include software modules such as a graphic user interface (GUI) module 82, an event collection/crawling module 84, a candidate PDI module 86, a transport engine module 88, and a personal digital footprints (PDF) module 90. Event collection/crawling module 84 may be used to collect events at regular predefined intervals or continuously, to check metadata for location and permission information, and to classify data by flagging specific files according to predefined conditions. Event collection/crawling module 84 may include any type of crawling, such offline crawling, online crawling, and/or real time (RT) crawling. Transport engine module 88 may move data between data elements in accordance with sets of rules.

In some embodiments, the computerized device executing the code for PD management application 80 may control the process for identifying and locating personal digital identifiers (PDI) of a user located in a plurality of data elements stored in storage devices 60. In other embodiments, some or all of the software modules PDI management application 80 may be executed by two or more processors in the plurality of processors in respective two or more computerized devices from the plurality of computerized devices.

In some embodiments, data element 70, which may include PDIs of the user, may be stored in storage device 60. Each data element 70 in the plurality of data elements stored in storage device 60 may be denoted data element 70_1, data element 70_2, . . . data element 70_m, where m is the number of data elements in storage device 60. Each data element 70_m may include data 72, metadata 74 (e.g., specifies in part, a location and/or permissions of data element 70_m), and/or a classification 76.

Processor 30 may include one or more processing units, e.g. of one or more computers. Processor 30 may be configured to operate in accordance with programmed instructions stored in memory 35. Processor 30 may be capable of executing PDI management application 80 for identifying and locating personal digital identifiers (PDI) of a user located in data elements 70 stored in storage devices 60 in each of computerized devices 20 in computerized system 10.

Processor 30 may communicate with output device 45. For example, output device 45 may include a computer monitor or screen. Processor 30 may communicate with a screen of output device 45 to display user GUI 82. In another example, output device 45 may include a printer, display panel, speaker, or another device capable of producing visible, audible, or tactile output.

Processor 30 may communicate with input device 40. For example, input device 40 may include one or more of a keyboard, keypad, or pointing device for enabling a user to inputting data or instructions for operation of processor 30.

Processor 30 may communicate with memory 35. Memory 35 may include one or more volatile or nonvolatile memory devices. Memory 35 may be utilized to store, for example, programmed instructions for operation of processor 30, data or parameters for use by processor 30 during operation, or results of operation of processor 30.

Processor 30 may communicate with data storage device 60. Data storage device 60 may include one or more fixed or removable nonvolatile data storage devices. The plurality of storage devices 60 in system 10 may be used to store the plurality of data elements 70 with the PDIs of the user.

In some embodiments, storage devices 60 in system 10 may include a computer readable medium for storing program instructions for operation of processor 30. In this example, the programmed instructions may take the form of PDI management application 80 for identifying and locating personal digital identifiers (PDI) of a user located in data elements 70 stored in storage devices 60.

It is noted that data storage device 60 may be remote from processor 30. In such cases data storage device 60 may be a storage device of a remote server storing data elements 70. Data storage device 60 may be utilized to store data or parameters for use by processor 30 during operation, or results of operation of processor 30.

In operation, processor 30 may execute a method for identifying and managing personal digital identifiers (PDI) of a user located in data elements 70 stored in storage devices 60 in each of computerized devices 20 in computerized system 10.

General Data Protection Regulation (GDPR) of the European Union is the new data privacy and data management requirements for the EU. Similar data privacy and data management requirements may soon appear in the other countries soon for maintaining the security and privacy of personal information, such as the California Consumer Privacy Act (CCPA), for example. Some of the key aspects of GDPR may include identifying where the personal information of a user is maintained, enforcing permissions on access to the user's personal information, and allowing the user to be aware of the existence of the user's PDIs including options to move, erase, and/or handle the user's PDIs.

The PDIs may relate to any person and/or any entity that has something to do with an organization, whether the person is an employee, or an external user, customer, and/or contractor that may be using the organization's software and/or services. At the core of the data privacy regulations is what constitutes personal information for identifying a user. Suppose, two companies not related. The two companies may maintain customer data. These two companies may agree to share PDIs of common customers, but only cross-company indicators, not general data. For example, Facebook and E-Bay customers using both company services may have other personal data that may not be available to the company.

Personal digital identifiers (PDIs) may include a set of identifiers that any or all of them may be used to identify a user. These identifiers and/or categories of identifiers may be different for different users in the organization on an individual basis, group membership, department, a job function, geographic location, for example. These PDIs may be stored in a plurality of data elements in the computerized system of the organization. The data elements may include, for example, a file, a folder, a mail message, a text or IM message, a sharepoint article, an entry in a database or a non-transactional database, or a web page. There are no limitations to the types of platforms on which the plurality of data elements may be stored. These platforms may include, for example, a Window's server, Linux, MAC, NAS device, cloud storage, or enterprise DB-based applications.

The data may be spread across multiple different instances and/or backups over multiple different locations.

PDIs may include, for example, social security numbers (SSN), the full name of the user, special company/corporate ID, insurance number, credit-card number, and user login names and passwords, and the like. Thus, if there is a data element (e.g., files, mail communication, post, or messages) in the computerized system of the organization that include any of the identifiers associated with a person, this data element should be considered personal-relevant, and thus important under GDPR.

In some embodiments for data privacy regulation compliancy such as GDPR compliancy, for example, computerized system 10 may use indexing in searching for personal data in indexes of databases, for example. A username of an employee in a company may be the employee's Worker ID number. There may be a whole set of files stored in storage devices 70 scattered and physically located at different locations in computerized system 10 with personal information relevant to John Smith. Classification of the indexes may also be applied. Certain pattern of characters and/or numbers may be searched for in files (e.g., data elements) and when identified, the files may be marked. Suppose PDI management application 80 identifies a social security number (SSN) and a phone number in a file, but does not know the corresponding name of the owner of the SSN, so this involves a search. Full indexing may be available so that the existing indexes may be used to search files. A database may be maintained to match a name with personal identifiable data.

In some embodiments, one method for obtaining personal data is a digital form that queries a user for personal information and then applies indexing. In this manner, different user profiles may be obtained such as first name, last name, and SSN. A search from index database may be executed. The index may include all the content of the files, such as "Hello this is Joshua", for example. The index may have HELLO in the first index of the database. Database indexes manage where are the files are located.

In some embodiments, another method for managing personal data under data privacy standards may be to continually search for PDIs in indexed databases in an enterprise. For example, a company's human resource database may have the user's personal data. A domain controller in each of the computerized devices 20 may be used to look for those users, so as to obtain enriched information from the domain server. On Microsoft Servers, a domain controller (DC) may be a server computer that responds to security authentication requests (e.g., logging in, checking permissions, etc.) within a Windows domain. The domain controller may start by identifying users in a certain environment. Raw user information such as login information may be further enriched with personal data from third party databases (e.g., social networks such as Linkedin) to fetch more personal data such as e-mail accounts, birth dates, for example.

In some embodiments, automatic ways to extract PDI in an organization may be performed by searching databases that may hold all user accounts. The PDIs may be stored in a PDI directory services or database such as an Active directory by Microsoft (or Azure AD cloud computing services). In this manner, user PDIs may be easily extracted such as login name, password, phone number, title, address, and/or office location.

In some embodiments, personal identifiable data enrichment may be performed by obtaining query-based personal information. A digital form may be used to first show a user a list of the personal identifiable data (e.g., PDIs) that the system maintains on the user. The digital form may request the user to enter more of the user's PDIs. In the context of GDPR compliancy, for example, the company via the online form, queried the user for more personal identifiable information and displayed to the user that personal identifiable data already maintained by the organization and may ask the user to verify the PDIs. In other embodiments, an employee of a company may receive an email asking the user what are their PDIs. A link to the digital form may be sent in the e-mail including a list of all PDIs that the employer has on the employee. The employee may be requested to verify if the list is complete. The employee may be permitted to modify the employee's PDIs.

In some embodiments, users may request to see access permissions of the user's PDIs. A subsystem for leveraging event collection may be implemented to determine who may access which files, when and where, that may include the user's PDIs. Another subsystem may be implemented to map and to extract information about permissions on data elements (e.g., files, folders, sharepoint documents, and/or e-mails). Another subsystem implemented may be the indexing itself. Rules may be created for data transport using a data transport engine, which may move all data files or element based on these rules a regular basis to a certain location or folder. This may also allow the user using this subsystem to delete the user's private data under data privacy compliance regulations, such as GDPR.

In some embodiments, another feature with regard to indexing may be where PDI management application 80 may instruct the plurality of computerized devices 20 to perform searches for the user's PDIs in the data elements stored in the plurality of storage devices 60. In some embodiments, when user logs in to a computerized device executing PDI management application 80, for example. PDI management application 80 may request the user's PDIs and in response, may instruct the plurality of computerized devices 20 to search for the user's PDI in data elements respectively stored in the plurality of storage devices. In other embodiments, PDI management application 80 may search for user PDIs for each user in a list of users at regular intervals, for example, daily, or in real time when a file or data element is modified.

In some embodiments, system 10 may be configured to automatically extract PDIs for each of the users. PDI management application 80 may use a domain controller to extract all users in the organization. Event collection/crawling module 84 may determine who are the active users in the organization, and for these users, may check against crawling information if these users are allowed to access a file (e.g., permission information). The collected data elements identified with PDIs of the users may be further enriched by searching in third party systems, on condition that system 10 has proper authorization to access and search data elements in a third-party system. Third party systems may include, for example, human resources, LinkedIn, Facebook, and the like. Additionally, the search may not be limited to search for the user's PDIs in the organization, but also to search data elements for user's PDIs in systems of clients of the organization or company. Some companies, for example, may maintain an archive or history of files for providing maintenance to clients, which may be searched for user's PDIs.

In some embodiments, priority may be assigned as to what information should be first searched by the search engine. The activity, classification and permissions of the data elements may determine when the data elements may be searched.

In some embodiments, classification may flag the data elements that are based on certain conditions such as flagged at security classification. Top secret data elements, for example, may be searched first for a user's PDIs.

In some embodiments, system 10 may extract the user's PDIs from the data elements in a batch, or on-the-fly to a particular location.

Figure 2:
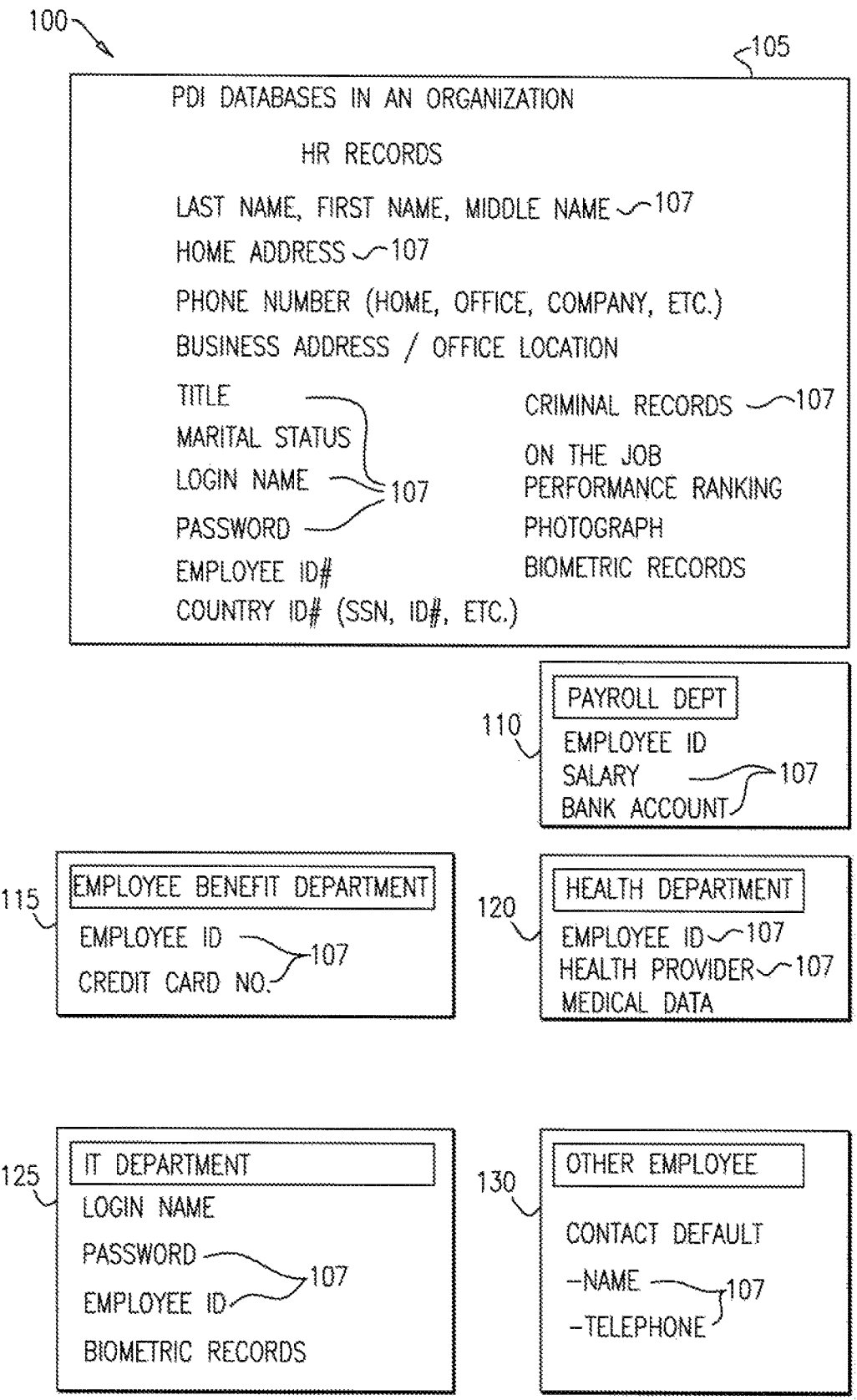
FIG. 2 schematically illustrates example data elements including personal digital identifiers (PDIs) stored in a computerized system, in accordance with some embodiments of the present disclosure.

FIG. 2 schematically illustrates example data elements 100 including personal digital identifiers (PDIs) stored in computerized system 10, in accordance with some embodiments of the present disclosure. The example shown in FIG. 2 may include databases with files (e.g., data elements 100) stored, for example, in storage devices of an enterprise, such as a company. The parameters shown in data elements of FIG. 2 are one record displaying the PDIs for a particular user. However, it should be understood that the each of the data elements may hold multiple records of PDIs for multiple users in the database.

In some embodiments, a human resource (HR) record database 105 may include a variety of PDIs 107 of multiple users such as employee records in the company. PDIs 107 may include the user's name, home address, phone numbers, business address/office location, title, login name, password, employee ID #, country identification numbers (SSN, ID number, etc), criminal records, performance ranking, photograph, and biometric records.

A payroll department database 110 may include an employee ID number, salary and/or bank account number without listing the name for protecting the privacy of the user. An employee benefit department database 115 may have had programs to allow company employees to purchase tickets to events, private insurance, vacation packages, for example. Database 115 may store the employee ID and credit card number used by the employee.

The company's health department (e.g., company infirmary) database 120 may include PDIs of the user such as employee ID, health provider, and personal medical data. The information technology (IT) department handling the security of the company computer accounts and entry points to the building where the user works may maintain an IT database 125, which may include PDIs of the user, such as the login name, password, employee ID and employee biometric data. Other employees in the company may maintain a list 130 of personal contacts in a file or database on the computerized device used by these other employees. List 130 may include the name and telephone of the user, for example.

The PDIs in data elements 100 in the example shown in FIG. 2 are merely for visual clarity and not by way of limitation of the embodiments of the present disclosure. Any type of PDI may be stored in data elements 100. Each of the database examples shown in FIG. 2 may be stored on the same and/or on different computerized devices 20 at the same or different locations in system 10. However, PDIs are not limited to data elements such as files including databases as shown in FIG. 2.

Figure 3:
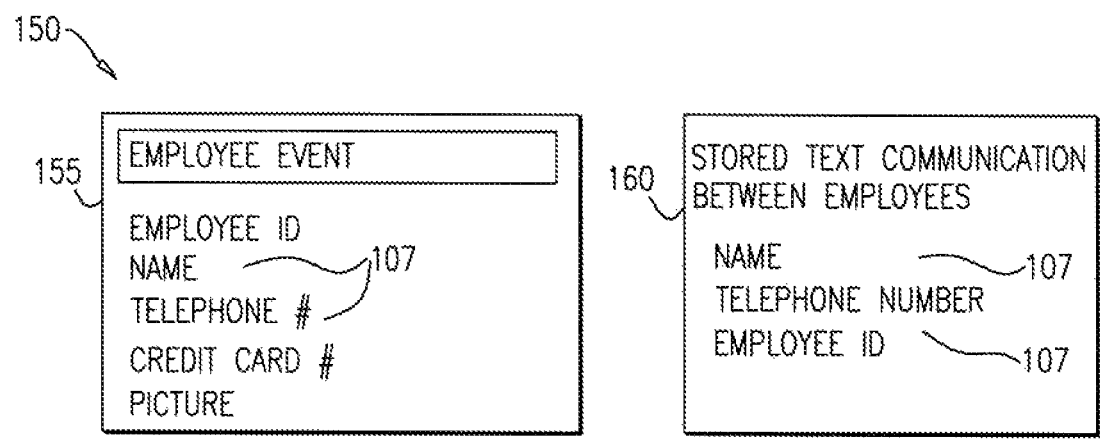
FIG. 3 schematically illustrates scattered data elements with personal digital identifiers (PDIs) stored in computerized system, in accordance with some embodiments of the present disclosure.

FIG. 3 schematically illustrates scattered data elements 150 with personal digital identifiers (PDIs) stored in computerized system 10, in accordance with some embodiments of the present disclosure. Scattered data elements 150 may include PDIs in generated files and may be stored on multiple different computerized devices 20 in computerized system 10. For example, a worker in the Employee benefit department organizes an employee social event in which the employee pays a fee to attend and maintains all of the data of the participants of the employee event in a file 155. File 155 may include PDIs of the participant employee such as the employee ID number, name, telephone number, credit card number to pay for the event, and a picture.

In some embodiments, a first employee may send a text message 160 to second employee using a company mobile device. Text message 160 may be stored in one of the plurality of storage devices 60. Text message 160 may include PDIs such as the employee name, employee ID, and the telephone number of the first employee and in some cases, those of the second employee. If the first employee texted any personal data, that would also be stored inside the text message as a searchable PDI.

Although GDPR is one example where computerized systems detecting and/or managing PDIs stored therein are required to comply with data privacy standards, it is not by way of limitation of the embodiments of the present disclosure. The method and system taught herein may be applied to managing any personal data for complying with other data privacy standards in a system that stores, manages, and/or handles PDIs in data elements in a computerized system.

The embodiments of the system described herein is a system for detecting PDIs for different users. This may be achieved with multiple different systems and techniques including directory services, such Microsoft Active Directory. Systems that manage accounts in the organization include PDIs such as the login accounts, usernames, and full names, for example. Master data management (MDM) systems, identity managers, and/or single sign-on systems that manages user identities across organizations, human resource (HR) systems may also be a source of personal information with PDIs about employees including many relevant details.

In some embodiments, an automated questionnaire with digital forms may be used to query a user as to what the user considers as PDIs used to identify the user. This system may also include automatically detected PDIs for the user, which allow the user to review, modify and/or add PDIs. Furthermore, automated questionnaires may ensure a full accountability of the end-user, when the user approves the PDIs of the user that the user entered the PDIs into the questionnaire.

In some embodiments, not all personal digital identifiers (PDIs) are equal in importance. Some PDI data may be more 'crucial' or 'valuable' to the user. For example, a login name of a user stored in a document is not as problematic or alarming as a credit-card number or a company ID found in a document, or the SSN of the user. For example, if the user's credit card number was compromised, the user may be subject to financial losses. If the user's SSN was compromised, the user may be subject to identify theft. On the other hand, if the login name of a user account may be compromised, the login name or corresponding password may be changed A combination of multiple PDIs may also increase the severity or importance of maintaining data privacy.

In some embodiments, the computerized system may assign different weights to each PDI reflecting the severity or the importance of the PDI. The weight may be determined per user, group, department or system. Assigning the weight may be performed either automatically or manually. Weights may be updated dynamically based on feedback of the results collected based from the PDIs.

In some embodiments, once all of the PDIs of a user are collected, the computerized system may apply indexing or database storage to organize the results, and/or to start indexing or classifying the data elements with specific searches for the different users' PDIs. Thus, the system may create a list of all the data elements for each user that includes his personal information. This list may be referred to herein as a Personal Digital Footprints (PDFs), or the set/list of data elements that include personal information for a given user. The PDFs may be pre-calculated and/or stored in a secured environment or database. The PDFs may be generated on-demand in real-time upon request if index results may be already available in the computerized system.

In some embodiments, the PDF may include a risk assessment reflected in the weights of the PDIs detected. The risk assessment may be based on other relevant data streams where the plurality of data elements may include the user profile (e.g., high risk, executive, activity—how much, by who, and from where; classification-on top of the PDIs, the classification of a data element (e.g., secret, important, or private), and/or permissions, (e.g., who can access the PDIs in the data elements, for example, and what is the associated risk?)

In some embodiments, the computerized system generating PDFs may be configured to report the PDI finding to the user, to delete the personal data at the user's request, (e.g., the right to be forgotten, whether this is performed by an IT admin, or automatically via a digital form), to move personal data to a different place, location, and/or platform so as to distribute the personal data differently, and to remediate and/or lock and/or change permissions in the personal data.

Figure 4:
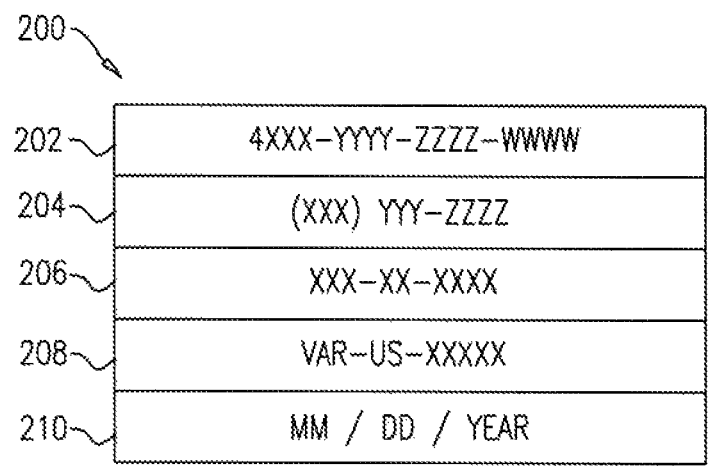
FIG. 4 schematically illustrates example patterns of identifiers of the personal digital identifiers, in accordance with some embodiments of the present disclosure.

FIG. 4 schematically illustrates example patterns of identifiers of the personal digital identifiers, in accordance with some embodiments of the present disclosure. When the user enters a request for a report on the user's personal information stored in computerized system 10 into a computerized device 20A, for example, processor 30A executing PDI management application 80 may fetch predefined patterns of identifiers 200 of the personal digital identifiers from a database 200. In other embodiments, personal digital identifiers may be obtained by manual entry by the user into GUI 82, in addition to the PDIs. Patterns of identifiers 200 may be used to facilitate the search for PDIs over large numbers of data elements 70 stored in the plurality of storage devices 60. Patterns of identifiers may be predetermined by initial searches, user inputted, and/or may be recommended patterns for multiple different data elements.

In some embodiments, a VISA credit card number identifier pattern 202 may include a format 4XXX-YYYY-ZZZZ-WWWW, for example, where W,X,Y, and Z may be any numbers. Processor 60 may be configured to identify text strings in data elements 70 with this string format indicative of a VISA credit card number. Other patterns of identifiers 200 of the personal digital identifiers may include a U.S. telephone number pattern 204 with a format (XXX) YYY-ZZZZ, a U.S. social security number pattern 206 with a format XXX-XX-XXXX, a birthdate 210 with a format MM/DD/YYYY, and an employee ID number pattern 208 of a multinational company, whose name has a first three letter "VAR" with a format VAR-CC-XXXXX. Country code CC=US denotes the employee is based in the U.S. and CC=IN denotes the employee is based in India, for example. Example patterns of identifiers 200 shown in FIG. 4 are merely for conceptual clarity and not by way of limitation of the embodiments taught herein. Birthdate 210 may include a variety of alternative formats such as MM-DD-YY or DD/MM/YYYY, for example. Patterns of identifies of PDIs may be applied to any PDI and are not limited to what is shown in FIG. 4.

Figure 5:
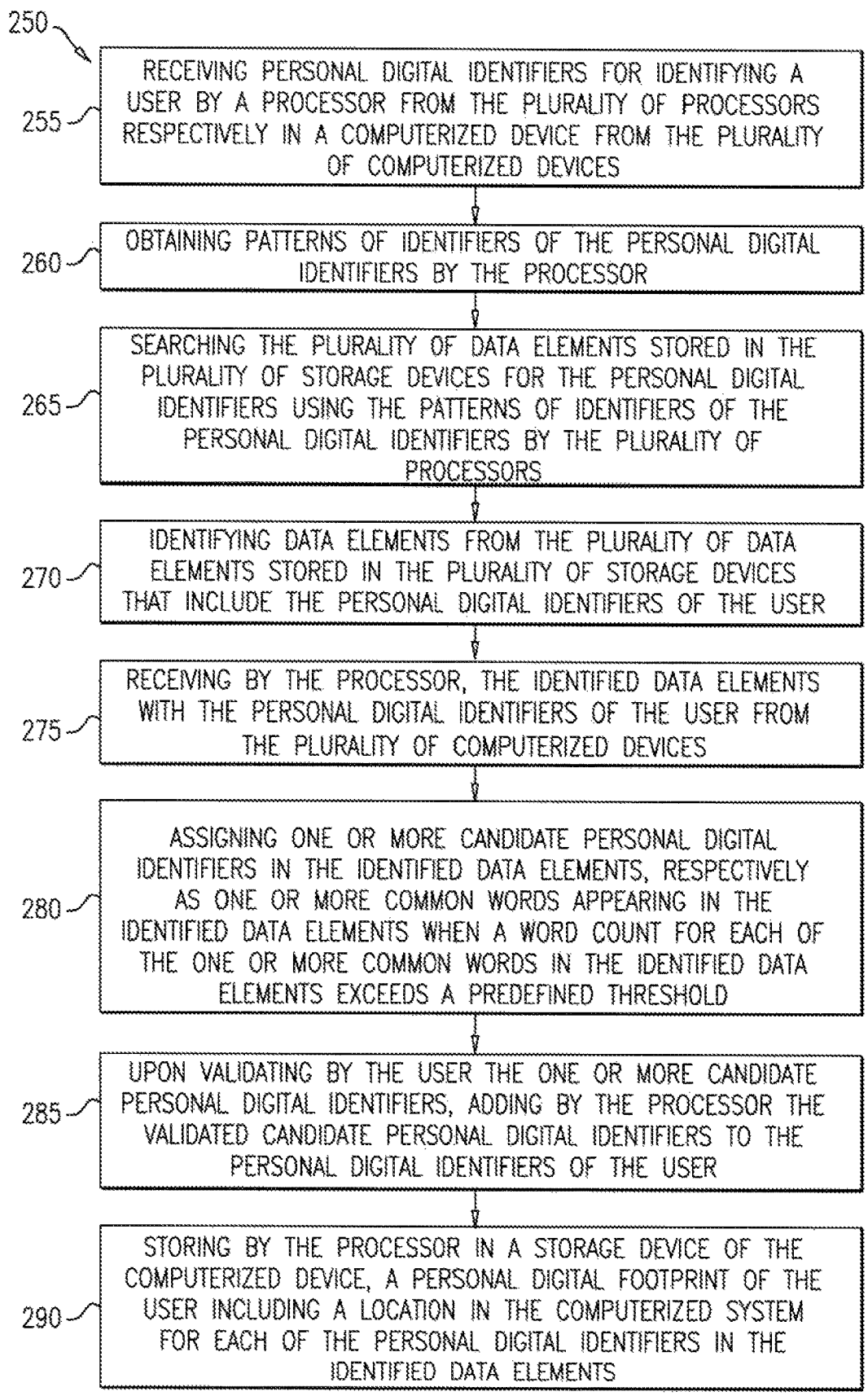
FIG. 5 is a flowchart depicting a method for managing personal digital identifiers of a user in a plurality of data elements stored in a computerized system.

FIG. 5 is a flowchart depicting a method 250 for managing personal digital identifiers of a user in a plurality of data elements 70 stored in computerized system 10, in accordance with some embodiments of the present disclosure. Computerized system 10 may include a plurality of computerized devices 20. The plurality of computerized devices 20 may include the plurality of processors 30 or the plurality of storage devices 60 storing the plurality of data elements 70, or both. Each of the plurality of computerized devices 20 may communicate with each other over communication network 27.

Method 250 may be executed typically by PDI management application 80 executed by one processor running on one of computerized devices 20 (e.g., computerized device 20A) in computerized system 10. Computerized device 20A from the plurality of computerized devices 20 may be used by the user or an IT administrator to input PDIs of the user to PDI management application 80 executed by one processor in the one computerized device.

The designation of one computerized device, such as computerized device 20A in the plurality of computerized devices 20 in system 10 that may be configured to run PDI management application 80 is merely for conceptual clarity and not by way of limitation of method 250 as shown in FIG. 5. Any one of the plurality of computerized devices 20 may be assigned to run PDI management application 80 for controlling the management of the PDIs of the user in computerized system 10.

Method 250 may include receiving 255 personal digital identifiers for identifying a user by a processor from the plurality of processors respectively in a computerized device from the plurality of computerized devices. The user may input the user's initial PDIs into GUI 82 displayed on display 45 (e.g., output device 45). In some embodiments, an automated questionnaire displayed on GUI 82 may query the user to enter the user's PDIs (e.g., using input device 40).

Method 250 may include obtaining 260 patterns of identifiers of the personal digital identifiers by the processor from the plurality of processors. In response to entering the user's initial PDIs into GUI 82, processor 30 may fetch predefined patterns of identifiers of the inputted personal digital identifiers of the user as shown in FIG. 4. In some embodiments, the user may be queried on GUI 82 to enter the format of the inputted PDI so as to input the patterns of identifiers for the inputted PDIs.

Method 250 may include searching 265 the plurality of data elements stored in the plurality of storage devices for the personal digital identifiers using the patterns of identifiers of the personal digital identifiers by the plurality of processors.

Method 250 may include identifying 270 by the plurality of processors, data elements from the plurality of data elements stored in the plurality of storage devices that include the personal digital identifiers of the user.

Method 250 may include receiving 275 by the processor, the identified data elements with the personal digital identifiers of the user from the plurality of computerized devices.

Method 250 may include assigning 280 by the processor, one or more candidate personal digital identifiers in the identified data elements, respectively as one or more common words appearing in the identified data elements when a word count for each of the one or more common words in the identified data elements exceeds a predefined threshold.

Method 250 may include, upon validating by the user the one or more candidate personal digital identifiers, adding 285 by the processor the validated candidate personal digital identifiers to the personal digital identifiers of the user.

Method 250 may include storing 290 by the processor in a storage device of the computerized device, a personal digital footprint of the user including a location in the computerized system for each of the personal digital identifiers in the identified data elements.

Figure 6:
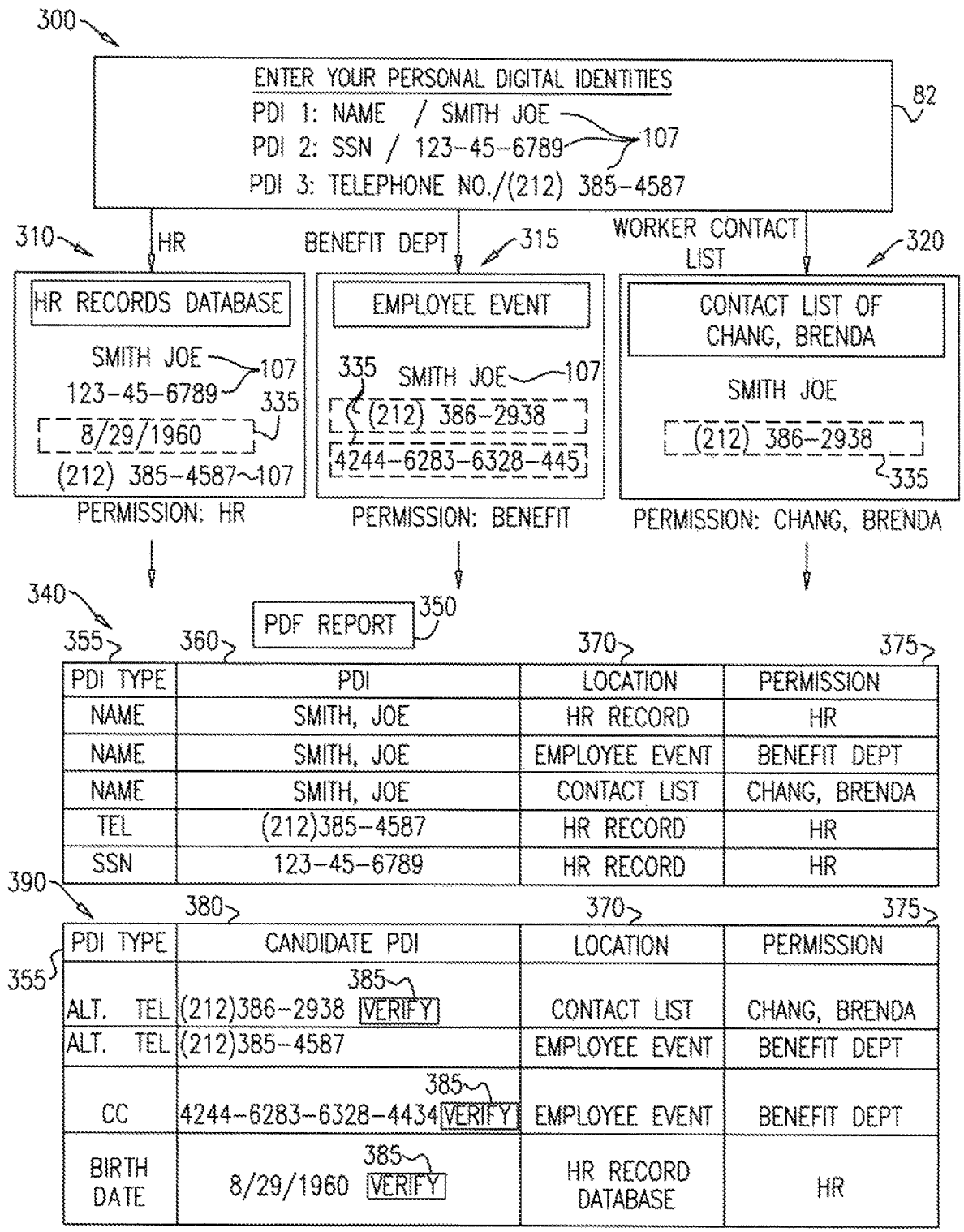
FIG. 6 schematically illustrates candidate personal digital identifiers (PDIs) and a personal digital footprint (PDF) of the user, in accordance with some embodiments of the present disclosure.

FIG. 6 schematically illustrates candidate personal digital identifiers (PDIs) 335 and a personal digital footprint (PDF) 350 of the user, in accordance with some embodiments of the present disclosure. GUI 82 on display 45 may be displayed to a user on one of the computerized devices 20 managing the PDIs 107 in computerized system 10. An example automated questionnaire 300 with digital forms displayed on display 45, for example, may be used to query a user as to what the user considers as PDIs 107 used to identify the user. In response, the user may identify his PDIs 107 as his name (e.g., SMITH, JOE), his social security number (SSN) (e.g., 123-45-6789), and his telephone number (e.g., (212) 385-4587), which the user enters into the digital forms of automated questionnaire 300.

Additionally, or optionally, (not shown in FIG. 6) automated questionnaire 300 may also request the user to enter an expected format of the PDIs (e.g., patterns of identifiers of the PDIs). However, the computerized device may use predefined patterns of identifiers such as shown in FIG. 4. Automated questionnaire 300 may be secure in the manner that the PDIs are displayed to the user on the form. For example, a full credit card number may not be shown to the user, just the last four digits of the credit card number for the user to verify. Automated questionnaire 300 may include validation in that the system will not show extraneous personal data that user will not be able to use.

In response, a search of the plurality of data elements stored in the plurality of storage devices may commence in the plurality of computerized devices. In some embodiments, the PDIs of the user received on one of the computerized devices that manages the PDIs in computerized system and the patterns of identifiers of the PDIs may be relayed over the communication network to the plurality of computerized devices 20. Each processor in the plurality of computerized devices may search the data elements stored in their respective storage device for the PDIs of the user.

For example, the search for PDIs in the computerized system may identify PDIs 107 of the user located in an HR database 310 with the name, SSN, and telephone number. However, the processor also identified a word 140 or a string of characters 8/29/1960 along with the identified PDIs of the user in HR database 310, the birthday of the user based on birthdate pattern identifier 210.

In a file 315 with details related to an employee social event located in a computerized device of the Benefits Department may include the PDI—the name of the user. However, two other words or strings of characters may be suspected as another telephone number of the user (e.g., (212) 386-2938) and a VISA credit card number of the user (e.g., 4244-6283-6328-4434) based telephone pattern identifier 204 and VISA credit card number pattern identifier 208.

A file 320 maintaining a contact list of the employee CHANG, BRENDA located on computerized device used by Brenda Chang may include a record with a name of the user, but also another words or strings of characters in the record identified as another telephone number of the user (e.g., (212) 386-2938) based telephone pattern identifier 204.

In some embodiments, three data elements (e.g., database 310, file 315, and contact list 320) include words or strings of characters suspected of being PDIs of the user. This may be due to the words or strings of characters matching predefined patterns of identifiers of PDIs. These words may be identified as candidate PDIs 335 in the example shown in FIG. 6.

In some embodiments, common words or strings of characters may not match patterns of identifiers of PDIs. Nevertheless, the words or strings of characters may appear multiple times in the data elements identified with the user-defined PDI. When a word count for each of these one or more common words in the data elements identified with the user's PDIs exceeds a predefined threshold, the one or more common words may be respectively assigned as one or more candidate PDIs 335. In this manner, system 10 may deduce additional PDIs in the data elements identified with the user's PDIs that the user was unaware of or simply did not enter into automated questionnaire 300, for example. The term common word may refer herein to common strings, common strings of letter and/or numbers, common patterns of letters and/or numbers, or common characters found in the data elements. When the word count of the common words exceeds a predefined threshold, these common words may be assigned as candidate PDIs 335.

In some embodiments, histograms of common words may be assessed. When the occurrence of the common words exceeds a predefined threshold of occurrence in the histogram, the common words may be assigned as candidate PDIs.

In some embodiments, personal digital footprint (PDF) report 350 may be displayed to the user. PDF report 350 may include a listing 340 of the PDIs identified by the user with columns PDI 360, a PDI type 355, a location 370, and access permissions 375 to the PDIs of the user.

In some embodiments, PDF report 350 may include a second listing 390 of candidate PDIs 335 in the identified data elements with PDIs of the user. Second listing 390 may include columns candidate PDI 380, PDI type 355, location 370, and access permissions 375 to the PDIs of the user. In other embodiments, second listing 390 may include a "VERIFY" button 385. If the user, upon viewing second listing 390 in PDF report 350, identifies the listed candidate PDIs as the user's personal information, the user may click on VERIFY button 385, which adds the verified candidate PDI to the list of the user's PDIs.

In some embodiments, during the process of collecting PDIs and identifying candidate PDIs, there may be errors or "false-positives" in the PDI collection. These PDI errors may be eliminated, for example, by the user verifying the PDIs in PDF report 350.

In some embodiments, the user may request to update the PDIs. This may be in response, for example, to viewing PDF report 350.

The examples shown in FIG. 6 are simplistic merely for conceptual clarity and not by way of limitation of the embodiments of the present disclosure. In reality, many data elements in the enterprise of a company, for example, may be searched for PDIs. The PDF report may display hundreds of files, for example, to the user with the user's PDIs. Furthermore, location 370 of the identified PDFs may include a file path directory, an IP address, or any suitable parameter identifying the location. The access permissions may include any standard codes or appropriate designators signifying the access permissions to the user's PDIs by others in computerized system 10.

In some embodiments, every user (e.g., a specific person) may use GUI 82 of PDI management application 80, which is a wrapper for the search engine to run a search. PDI management application 80 tool may be accessible to a user through an application program interface (API), or other means of extraction, and is not limited to a GUI as shown in the example embodiments of the preceding figures.

In some embodiments, the search for PDIs in the data elements may be performed in the background or on the fly in real-time. The user may enter in a personal data profile (PDP) with a plurality of the user's PDIs (e.g., receiving 255 the PDIs in FIG. 5). In other embodiments, the PDPs for multiple users may be received 255 for each end user within the organization. The system may search 265 for PDIs using each user's PDP. The index engine may search cross platforms within a company or cross-companies or access social media. A personal digital footprint (PDF) of the identified PDIs may be stored 290 for each user.

In some embodiments, candidate PDIs may be evaluated for multiple users. Candidate PDIs may be assigned. The search for PDIs with the assigned candidate PDIs may be expanded without even notifying the users yet just by finding words or word patterns in common in the data elements, which already include identified PDIs. Thus, PDI management application 80 may determine with high probability that the candidate PDIs may be a real user PDI even if the user does not declare or verify them. The system may add these PDIs to the API or GUI digital form for the user to examine in a secure manner and to verify if the candidate PDI is in fact one of the user's PDIs.

In some embodiments, real time crawling and checking for the candidate PDI between companies sharing data and cross-referencing indicators over time may be a check as to how exposed the user's private identifiable information may be, who may access the user's data, and how the data may have been already accessed.

In some embodiments, system 10 may include a very complex enterprise environment at multiple different sites with thousands of different servers and different virtual clouds. The method for managing personal digital identifiers of a user in a plurality of data elements stored in a computerized system as taught herein cannot be done using one single CPU (e.g., computerized device 20). A plurality of computerize devices with a respective plurality of CPUs may be needed along special hardware topologies. Processor 30 may include CPU load 95 software and/or circuitry for assessing and/or measuring the CPU load of processor 30 in a computerized device 20. Similarly, TPT circuitry 55 may be used for measuring and/or assessing network data throughput (TPT).

In some embodiments, CPU loading in the plurality of computerized devices or data throughput in communications between the plurality of computerized devices in the communication network may be monitored. If the data throughput becomes severely reduced, or if the CPU becomes loaded in performing the method for managing personal digital identifiers of a user in a plurality of data elements stored in a computerized system as described herein, computerized devices, or network resources may be dynamically added or reduced in response to the monitored CPU loading or data throughput in the communications. The computerized system may be configured to add resources on the fly, so as to dynamically deploy multiple hardware and software resources on the fly. In other embodiments, special hardware modules may be switched in or out due to the communication network becoming loaded or starved (e.g., that are activated on or off depending on the traffic).

In some embodiments of the present disclosure, a computerized method for managing personal digital identifiers of a user in a plurality of data elements stored in a computerized system may be performed by a plurality of computerized devices communicating over a communication network of the computerized system. The plurality of computerized devices may include a plurality of processors or a plurality of storage devices storing a plurality of data elements. The method may include:

(a) receiving personal digital identifiers for identifying a user by a processor from the plurality of processors respectively in a computerized device from the plurality of computerized devices;

(b) obtaining patterns of identifiers of the personal digital identifiers by the processor;

(c) searching the plurality of data elements stored in the plurality of storage devices for the personal digital identifiers using the patterns of identifiers of the personal digital identifiers by the plurality of processors;

(d) identifying by the plurality of processors, data elements from the plurality of data elements stored in the plurality of storage devices that include the personal digital identifiers of the user;

(e) receiving by the processor, the identified data elements with the personal digital identifiers of the user from the plurality of computerized devices;

(f) assigning by the processor, one or more candidate personal digital identifiers in the identified data elements, respectively as one or more common words appearing in the identified data elements when a word count for each of the one or more common words in the identified data elements exceeds a predefined threshold;

(g) upon validating by the user the one or more candidate personal digital identifiers, adding by the processor the validated candidate personal digital identifiers to the personal digital identifiers of the user; and (h) storing by the processor in a storage device of the computerized device, a personal digital footprint of the user including a location in the computerized system for each of the personal digital identifiers in the identified data elements.

In some embodiments of the present disclosure, the method may include reporting by the processor the personal digital footprint to the user.

In some embodiments of the present disclosure, searching for the personal digital identifiers in the plurality of data elements may include assigning a priority to each of the personal digital identifiers and searching for the personal digital identifiers according to the assigned priority.

In some embodiments of the present disclosure, assigning the priority to each of the personal digital identifiers may include assigning a weight to each of the personal digital identifiers.

In some embodiments of the present disclosure, the method may include searching for the personal digital identifiers in data elements of other computerized systems communicating with the computerized system.

In some embodiments of the present disclosure, searching for the personal digital identifiers in data elements in the one or more additional computerized devices may include searching databases on third party storage devices.

In some embodiments of the present disclosure, searching the plurality of data elements may include searching the plurality of data elements for the personal digital identifiers in response to receiving the personal digital identifiers for identifying the user.

In some embodiments of the present disclosure, receiving the personal digital identifiers for identifying the user may include receiving a request from the user for the personal digital footprint of the user.

In some embodiments of the present disclosure, the method may include repeating (c) to (h) at predefined time intervals.

In some embodiments of the present disclosure, the method may include providing a risk assessment in the stored personal digital footprint of the user.

In some embodiments of the present disclosure, the method may include deleting some or all of the personal digital identifiers in the identified data elements in response to a deletion request.

In some embodiments of the present disclosure, the method may include moving some or all of the personal digital identifiers in the identified data elements to a different location in response to a move request.

In some embodiments of the present disclosure, the method may include moving some or all of the personal digital identifiers in the identified data elements to the different location in accordance with a set of rules for data transport.

In some embodiments of the present disclosure, the method may include changing access permissions of some or all of the personal digital identifiers in the identified data elements in response to a change access request.

In some embodiments of the present disclosure, receiving the personal digital identifiers for identifying the user may include entering by the user the personal digital identifiers on a digital form.

In some embodiments of the present disclosure, validating the one or more candidate personal digital identifiers by the user may include requesting the user to validate the one or more candidate personal digital identifiers appearing on a digital form.

In some embodiments of the present disclosure, the method may include monitoring CPU loading in the plurality of computerized devices or data throughput in communications between the plurality of computerized devices in the communication network, and dynamically adding or reducing computerized devices or network resources in response to the monitored CPU loading or data throughput in the communications.

In some embodiments of the present disclosure, the data elements may be selected from the group consisting of: files, folders, sharepoint documents, and e-mail messages.

In some embodiments of the present disclosure, the personal digital identifiers of the user may be selected from the group consisting of: user name, login name, passwords, phone numbers, title, addresses, office location, bank account information, social security number, country identification number, employee identification number, credit or debit card numbers, family member information, and marital status.

In some embodiments of the present disclosure, the personal digital footprint of the user may be stored in a secure environment or a secure database.

In some embodiments of the present disclosure, the computerized system may be an enterprise.

In some embodiments of the present disclosure, a computerized device for managing personal digital identifiers of a user in a plurality of data elements stored in a plurality of storage devices in a computerized system may include a plurality of storage devices in a computerized system communicating over a communication network storing a plurality of data element and a processor in a computerized device of the computerized system. The processor in the computerized device of the computerized system may be configured to receive personal digital identifiers for identifying a user, to obtain patterns of identifiers of the personal digital identifiers, to receive identified data elements with the personal digital identifiers of the user that were identified in a search of the plurality of data elements stored in the plurality of storage devices for the personal digital identifiers using the patterns of identifiers of the personal digital identifiers, to assign one or more candidate personal digital identifiers in the identified data elements, respectively as one or more common words appearing in the identified data elements when a word count for each of the one or more common words in the identified data elements exceeds a predefined threshold, upon validating by the user the one or more candidate personal digital identifiers, to add the validated candidate personal digital identifiers to the personal digital identifiers of the user, and to store in a storage device of the computerized device, a personal digital footprint of the user including a location in the computerized system for each of the personal digital identifiers in the identified data elements.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A computerized method for creating a list of data elements that includes an assessed complete subset of personal digital identifiers of a user in a plurality of data elements which are stored in a computerized system, the method comprising:
   in a computerized system comprising a. plurality of computerized devices communicating over a. communication network, the plurality of computerized devices including a plurality of processors or a plurality of storage devices storing a plurality of data elements:
   (a) receiving personal digital identifiers for identifying a user by a processor from the plurality of processors respectively in a computerized device from the plurality of computerized devices;
(b) obtaining patterns of identifiers of the personal digital identifiers by the processor;
(c) searching the plurality of data elements stored in the plurality of storage devices for the personal digital identifiers using the patterns of identifiers of the personal digital identifiers by the plurality of processors;
(d) identifying by the plurality of processors, data elements from the plurality of data elements stored in the plurality of storage devices that include the personal digital identifiers of the user;
(e) receiving by the processor, the identified data elements with the personal digital identifiers of the user from the plurality of computerized devices;
(f) assigning by the processor, one or more candidate personal digital identifiers in the identified data elements, respectively as one or more common words appearing in the identified data elements when a word count for each of the one or more common words in the identified data elements exceeds a predefined threshold;
(g) upon validating by the user the one or more candidate personal digital identifiers, adding by the processor the validated candidate personal digital identifiers to the personal digital identifiers of the user thus, assessing that the created list of data elements includes a complete subset of personal digital identifiers of the user in a plurality of data elements; and
(h) storing by the processor in a storage device of the computerized device, a list of all the data elements for each user that includes personal digital identifiers of the user, wherein the list is a personal digital footprint of the user including a location in the computerized system for each of the personal digital identifiers in the data elements in the list, and wherein the creating enables one or more operations on one or more personal digital identifiers in data elements in the list.

2. The method according to claim 1, wherein an operation of the one or more operations comprising reporting by the processor the personal digital footprint to the user.

3. The method according to claim 1, wherein searching for the personal digital identifiers in the plurality of data elements comprises assigning a priority to each of the personal digital identifiers and searching for the personal digital identifiers according to the assigned priority.

4. The method according to claim 3, wherein assigning the priority to each of the personal digital identifiers comprises assigning a weight to each of the personal digital identifiers.

5. The method according to claim 1, further comprising searching for the personal digital identifiers in data elements of other computerized systems communicating with the computerized system.

6. The method according to claim 5, wherein searching for the personal digital identifiers in data elements in the one or more additional computerized devices comprises searching databases on third party storage devices.

7. The method according to claim 1, wherein searching the plurality of data elements comprises searching the plurality of data elements for the personal digital identifiers in response to receiving the personal digital identifiers for identifying the user.

8. The method according to claim 1, wherein receiving the personal digital identifiers for identifying the user comprises receiving a request from the user for the personal digital footprint of the user.

9. The method according to claim 1, wherein repeating (c) to (h) at predefined time intervals.

10. The method according to claim 1, further comprising providing a risk assessment in the stored personal digital footprint of the user.

11. The method according to claim 1, wherein an operation of the one or more operations comprising deleting some or all of the personal digital identifiers in the identified data elements in response to a deletion request.

12. The method according to claim 1, wherein an operation of the one or more operations comprising moving some or all of the personal digital identifiers in the identified data elements to a different location in response to a move request.

13. The method according to claim 12, wherein an operation of the one or more operations comprising moving some or all of the personal digital identifiers in the identified data elements to the different location in accordance with a set of rules for data transport.

14. The method according to claim 1, wherein an operation of the one or more operations comprising changing access permissions of some or all of the personal digital identifiers in the identified data elements in response to a change access request.

15. The method according to claim 1, wherein receiving the personal digital identifiers for identifying, the usere comprises entering by the user the personal digital identifiers on a digital form.

16. The method according to claim 1, wherein validating the one or more candidate personal digital identifiers by the user comprises requesting the user to validate the one or more candidate personal digital identifiers appearing on a digital form.

17. The method according to claim 1, further comprising:
monitoring CPU loading in the plurality of computerized devices or data throughput in communications between the plurality of computerized devices in the communication network; and
dynamically adding or reducing computerized devices or network resources in response to the monitored CPU loading or data throughput in the communications.

18. The method according to claim 1, wherein the data elements are selected from the group consisting of: files, folders, documents in a collaboration system, and e-mail messages.

19. The method according to claim 1, wherein the personal digital identifiers of the user are selected from the group consisting of user name, login name, passwords, phone numbers, title, addresses, office location, bank account information, social security number, country identification number, employee identification number, credit or debit card numbers, family member information, and marital status.

20. The method according to claim 1, wherein the personal digital footprint of the user is stored in a secure environment or a secure database.

21. The method according to claim 1, wherein the computerized system is an enterprise.

22. A computerized device for creating a list of data elements that includes an assessed complete subset of personal digital identifiers of a user in a plurality of data elements which are stored in a plurality of storage devices in a computerized system, the computerized device comprising:
a plurality of storage devices iir a computerized system communicating over a communication network storing a plurality of data elements and a processor m a computerized device of the computerized system configured to receive personal digital identifiers.fore identifying a user, to obtain patterns of identifiers of the personal digital identifiers, to receive identified data elements with the personal digital identifiers of the user that were identified in a search of the plurality of data elements stored in the plurality of storage devices for the personal digital identifiers using the patterns of identifiers of the personal digital identifiers, to assign one or more candidate personal digital identifiers in the identified data elements, respectively as one or more common words appearing in the identified data elements when a word count for each of the one or more common words in the identified data elements exceeds a predefined threshold, upon validating by the user the one or more candidate personal digital identifiers, to add the validated candidate personal digital identifiers to the personal digital identifiers of the user, thus. assessing that the created list of data elements includes a complete subset of personal digital identifiers of the user in a plurality of data elements and to store in a storage device of the computerized device a list of all the data elements for each user that includes personal digital identifiers of the user, wherein the list is, a personal digital footprint of the user including a location in the computerized system for each of the personal digital identifiers in the data elements in the list, and wherein the creating enables one or more operations on one or more personal digital identifiers in data elements in the list.

* * * * *